US010958680B2

(12) United States Patent
Jain et al.

(10) Patent No.: US 10,958,680 B2
(45) Date of Patent: *Mar. 23, 2021

(54) METHOD TO MITIGATE VOLTAGE BASED ATTACKS ON KEY AGREEMENT OVER CONTROLLER AREA NETWORK (CAN)

(71) Applicant: Robert Bosch GmbH, Stuttgart (DE)

(72) Inventors: Shalabh Jain, Pittsburgh, PA (US);
Qian Wang, Greenbelt, MD (US); Md Tanvir Arafin, College Park, MD (US);
Jorge Guajardo Merchan, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 197 days.

This patent is subject to a terminal disclaimer.

(21) Appl. No.: 15/915,933

(22) Filed: Mar. 8, 2018

(65) Prior Publication Data

US 2018/0262527 A1    Sep. 13, 2018

Related U.S. Application Data

(60) Provisional application No. 62/468,705, filed on Mar. 8, 2017.

(51) Int. Cl.
*H04L 29/06* (2006.01)
*H04L 9/00* (2006.01)
(Continued)

(52) U.S. Cl.
CPC ............ *H04L 63/1441* (2013.01); *G09C 1/00* (2013.01); *H04L 9/003* (2013.01); *H04L 9/088* (2013.01);
(Continued)

(58) Field of Classification Search
CPC ..... H04L 9/088; H04L 9/003; H04L 63/1441; H04L 63/1475; H04L 2012/40215;
(Continued)

(56) References Cited

U.S. PATENT DOCUMENTS 7,167,527 B1 * 1/2007 Park .................... H04L 25/4917
375/286
9,417,643 B2 * 8/2016 Saint-Laurent ......... G05F 1/468
(Continued)

OTHER PUBLICATIONS

"CAN bus transport layer", [retrieved on Dec. 31, 2019], Retrieved from the Internet: <URL: https://uavcan.org/Specification/4._CAN_bus_transport_layer> (Year: 2017).*
(Continued)

*Primary Examiner* — Jung W Kim
*Assistant Examiner* — Sangseok Park
(74) *Attorney, Agent, or Firm* — Maginot, Moore & Beck LLP

(57) ABSTRACT

A method of operating at least one node in a communication network that uses a shared communication medium has been developed. The method includes adjusting, with a controller in a first node, a resistance of a first potentiometer in the first node to a first resistance level that the controller in the first node determines randomly, the first potentiometer in the first node being connected to an output of a transceiver in the first node and to a shared communication medium, and transmitting, with the transceiver in the first node, a first data bit through the output that is connected to the shared communication medium with the first potentiometer producing the first resistance level.

10 Claims, 9 Drawing Sheets

(51) Int. Cl.
G09C 1/00 (2006.01)
H04L 9/08 (2006.01)
H04L 25/00 (2006.01)
H04L 12/40 (2006.01)

(52) U.S. Cl.
CPC ...... *H04L 63/1475* (2013.01); *H04L 2209/84* (2013.01)

(58) Field of Classification Search
CPC ... H04L 2209/84; H04L 25/4917; G09C 1/00; H03H 7/38
See application file for complete search history.

(56) References Cited

U.S. PATENT DOCUMENTS

| 10,055,322 | B2* | 8/2018 | Olson | G06F 11/221 |
|---|---|---|---|---|
| 2004/0043739 | A1 | 3/2004 | Jordanger et al. | |
| 2011/0293036 | A1* | 12/2011 | Ishimaru | H04L 25/0278 375/295 |
| 2014/0043042 | A1* | 2/2014 | Billau | G06F 21/606 324/612 |
| 2014/0156899 | A1 | 6/2014 | Kristiansen | |
| 2015/0085411 | A1 | 3/2015 | Yang et al. | |
| 2015/0095711 | A1 | 4/2015 | Elend | |
| 2016/0254924 | A1 | 9/2016 | Hartwich | |
| 2017/0048063 | A1* | 2/2017 | Mueller | H04L 9/0838 |
| 2018/0219423 | A1* | 8/2018 | Maunder | H02J 50/12 |

OTHER PUBLICATIONS

K. Baddam and M. Zwolinski, "Evaluation of Dynamic Voltage and Frequency Scaling as a Differential Power Analysis Countermeasure", 20th International Conference on VLSI Design (VLSID'07) [online][retrieved on Jan. 6, 2020]. Retrieved from: IEEEXplore (Year: 2007).*
International Search Report and Written Opinion in corresponding PCT patent application No. PCT/US2018/021596 dated Aug. 14, 2018 (10 pages).
Aciiçmez, Onur et al., "Predicting Secret Keys Via Branch Prediction," Springer Berlin Heidelberg, LNCS 4377, pp. 225-242, 2007 (18 pages).
Bernstein, Daniel J., "Cache-timing Attacks on AES," Apr. 2005 (37 pages).
Brumley, David et al., "Remote Timing Attacks are Practical," Proceedings of the 12th Conference on USENIX Security Symposium vol. 12, SSYM'03. USENIX Association, 2003.
Jain, Shalabh et al., "Physical Layer for Group Key Agreement for Automotive Controller Area Networks," in Proc. of Cryptographic Hardware and Embedded Systems (CHES 2016). Springer Berlin Heidelberg, 2016 (20 pages).
Kocher, Paul et al., "Differential Power Analysis," CRYPTO'99, LNCS 1666, pp. 388-397, 1999 (10 pages).
Kocher, Paul C., Timing Attacks on Implementations if Diffie-Hellman, RSA, DSS, and Other Systems, CRYPTO 96, LNCS 1109, pp. 104-113, 1996 (10 pages).
Microchip, Datasheet MCP2551, Technical Report, Microchip, retrieved from Internet: http://ww1.microchip.com/downloads/en/DeviceDoc/20001667G.pdf, accessed Nov. 11, 2016 (26 pages).
Müller, Andreas et al., "Plug-and-Secure Communication for CAN," CAN Newsletter, pp. 10-14, Dec. 2015 (5 pages).
Murvay, P.S. et al., "Source Identification Using Signal Characteristics in Controller Area Networks," IEEE Signal Processing Letters, vol. 21, Issue 4, pp. 395-399, Apr. 2014 (5 pages).
Cortes, C. et al., "Support-Vector Networks," Machine Learning, vol. 20, No. 3, pp. 273-297, 1995 (25 pages).
Hochreiter, Sepp et al., "Long Short-Term Memory," Neural Computation, vol. 9, No. 8, 1997 (32 pages).
Krizhevsky, Alex et al., "ImageNet Classification with Deep Convolutional Neural Networks," Neural Information Processing Systems, 2012 (9 pages).
Kruskal, Joseph B., "On the Shortest Spanning Subtree of a Graph and the Traveling Salesman Problem," Proceedings of the American Mathematical Society, vol. 7, No. 1, pp. 48-50, 1956 (3 pages).
Pettie, Seth et al., "An Optimal Minimum Spanning Tree Algorithm," Journal of the ACM, vol. 49, No. 1, 2002, pp. 16-34 (19 pages).
Prim, R.C., "Shortest Connection Networks and Some Generalizations," The Bell System Technical Journal, vol. 36, No. 6, pp. 1389-1401, 1957 (13 pages).
SAK, H. et al., "Long Short-Term Memory Recurrent Neural Network Architectures for Large Scale Acoustic Modeling," In Proceedings of Interspeech, pp. 338-342, 2014 (5 pages).
Simonyan, K. et al., "Very Deep Convolutional Networks for Large-Scale Image Recognition," Cornell University Library, submitted Sep. 2014, updated Apr. 2015, arXiv:1409.1556v6, retrieved from internet: https://arxiv.org/abs/1409.1556 (14 pages).

* cited by examiner

METHOD TO MITIGATE VOLTAGE BASED ATTACKS ON KEY AGREEMENT OVER CONTROLLER AREA NETWORK (CAN)

CLAIM OF PRIORITY

This application claims the benefit of U.S. Provisional Application No. 62/468,705, which is entitled "Method to Mitigate Voltage Based Attacks on Key Agreement over Controller Area Network (CAN)," and was filed on Mar. 8, 2017, the entire contents of which are expressly incorporated herein by reference.

FIELD

This disclosure relates generally to the field of network communications and, more specifically, to systems and methods for secure communication using shared communication media.

BACKGROUND

The Controller Area Network (CAN) bus communications standard provides a robust communication interface that is used in a wide range of applications including, but not limited to, automobiles and other transportation vehicles, building automation, industrial systems, robotics, and other fields that require communication between embedded digital devices using a shared communication medium. Many CAN bus embodiments employ two electrically conductive wires, which are referred to as CAN-High (CANH) and CAN-Low (CANL), and electronic devices, which are referred to as "nodes" use the CANH and CANL wires as a shared communication medium to transmit and receive data using a standardized data frame format. The CAN bus typically utilizes of a pair of shielded or unshielded twisted pair of cables as the physical medium for signal transmission.

During normal operation, the nodes perform a bus arbitration process when one or more nodes wish to transmit a data frame to ensure that only one node actually transmits data on the CAN-High and CAN-Low lines at a time to provide reliable communication without "collisions" that occur when two or more nodes transmit simultaneously. In the CAN bus standard, when transmitting the dominant bit '0' on the bus, the output pins CANH and CANL are driven to different voltage levels, and the difference from CANH to CANL is the output of the CAN bus. Similarly, transmission of a recessive bit '1' occurs when CANH and CANL are not driven and will have similar voltage levels. Because the CAN bus is a shared communication medium, every node that is connected to a CAN bus can read each bit of data that is transmitted through the bus. This property of CAN bus presents problems when two nodes wish to communicate data privately that cannot be understood by other nodes that are connected to the bus.

Recent advancements to CAN bus implementations include configurations in which two nodes that are connected to the CAN bus transmit bits of data simultaneously (to produce a collision intentionally) to exchange cryptographic key data in a manner that prevents third party nodes from being able to determine which of the two transmitting nodes is actually transmitting information that forms a part of the cryptographic key. In one part of these key exchange techniques, two nodes simultaneously transmit a logical 1 and a logical 0 signal, followed by simultaneous transmission of the logical complement of the original bits from both nodes, which produces a summed voltage differential between the CANH and CANL wires that can be detected by each of the attached nodes. However, while all of the devices that are attached to the CAN bus can detect the transmission of a dominant bit (logical 0) through the CAN bus, because the two nodes transmit simultaneously the other nodes that are connected to the CAN bus cannot determine which of the two nodes is transmitting the dominant 0 or the non-dominant 1 at any one time during the transmission sequence of the 0/1 bit followed by the logical complement, and only the two transmitting nodes do know which bit is being transmitted. The two nodes transmit the logical 0 and 1 bits and their logical complements in a randomized manner (if both nodes transmit a logical 00/11 sequence or logical 11/00 sequence then the transmission is ignored since those signals do enable third parties to determine the data transmitted from each node), which prevents other nodes connected to the CAN bus from detecting the identity of the node that transmits each bit. This operation, which is repeated many times and combined with other techniques that are not described in greater detail herein, forms the foundation to enable two nodes—and indirectly even larger groups of nodes—to exchange data that form the basis for shared cryptographic keys. After the nodes have exchanged cryptographic keys, those shared keys are used to perform data encryption and authentication/verification operations using techniques that are otherwise known to the art that enable different subsets of the nodes on the bus to exchange data that cannot be decrypted or altered in an undetectable manner by other nodes that are connected to the CAN bus.

As described above, nodes that are connected to the CAN bus with standard CAN bus transceivers can detect the voltage signals corresponding to logical 0 and 1 levels through the CANH and CANL wires of the CAN bus. When two nodes transmit a logical 0 and 1 simultaneously, the transceivers of most standard CAN nodes cannot determine which of the two nodes transmitted the logical 0 and 1. However, at a physical level the electrical signals that are transmitted through the CAN bus do not perfectly correspond to the logical 0 and 1 levels of digital logic that are described above because the physical components of the CAN bus and the nodes themselves have complex and different analog electrical properties. In some instances, an adversary, which is either a legitimate hardware node in the CAN bus that has been compromised by malicious software or an unauthorized hardware device that is electrically connected to the CAN bus, performs high-precision measurements of the properties of the electrical signals that are transmitted through the CAN bus in a manner that may enable the adversary to determine which node transmits the logical 0 and which node transmits the logical 1 signal in the process that is described above. In particular, since both nodes transmit a logical 0 and logical 1 in the randomized order for each bit exchange, the adversary can monitor signal characteristics of the dominant bit signal (the logical 0) that is transmitted from each node. The adversary can then reconstruct the secret data that is shared between the two nodes and compromise the security of the CAN bus system. This class of attacks is referred to as a side-channel attack because the adversary extracts information based on precise electrical signal measurements that are affected by the physical properties of the bus and the nodes that are connected to the bus in a particular CAN bus system even though the adversary has not defeated the logical protocol for cryptographic key exchange that is described above.

FIG. 1 depicts an example of a prior art CAN network 100 that includes three CAN nodes 104, 106, and 108 that are each connected to a CANH conductor 112 and CANL conductor 116 that are terminated by resistors 118 to form a CAN bus. The adversary node 124 is also electrically connected to the CAN bus and the adversary node includes electrical signal measurement and signal processing hardware that enables the adversary to perform one or more side-channel attacks. As described above, side-channel attacks present challenges to maintaining security in shared medium communication networks such as CAN bus.

Consequently, improvements to methods and systems that reduce or eliminate the threats from these side-channel attacks would be beneficial.

SUMMARY

The embodiments described herein include new methods to perform side-channel attacks against systems that utilize the simultaneous transmission of data between two nodes for key agreement through a shared communication medium such as CAN bus. The embodiments also include methods and systems that provide countermeasures to reduce or eliminate the ability of an adversary to determine which node transmits a logical 0 or 1 signal when two nodes transmit the signals simultaneously through the CAN bus even when the adversary is configured to physically probe the channel. These embodiments enable obfuscation of the voltage observed by an adversary with minimal circuit changes. The advantages of the embodiments described herein include, but are not limited to, techniques to protect devices that rely on simultaneous transmission of data bits to establish a private channel for cryptographic key exchange from voltage probing attacks and leakage. These schemes include utilize techniques such as changing network characteristics, enabling cooperation between nodes and voltage regulation circuits.

In one embodiment, a method of operating at least one node in a communication network that uses a shared communication medium has been developed. The method includes adjusting, with a controller in a first node, a resistance of a first potentiometer in the first node to a first resistance level that the controller in the first node determines randomly, the first potentiometer in the first node being connected to an output of a transceiver in the first node and to a shared communication medium, and transmitting, with the transceiver in the first node, a first data bit through the output that is connected to the shared communication medium with the first potentiometer producing the first resistance level.

In another embodiment, a method of operating a node in a shared communication network that provides voltage feedback to a shared communication medium has been developed. The method includes detecting, with a transceiver in the node, that a bit is being transmitted by another node through a shared communication medium that is connected to the transceiver, sampling, with a sample and hold circuit in the node, a voltage level in the shared communication medium while the bit is being transmitted by the other node through the shared communication medium, generating, with a differential amplifier, an output signal corresponding to a difference between the voltage level from the sample and hold circuit and a predetermined reference voltage, generating, with a summing amplifier and an inverting amplifier, a correction voltage level based on a sum of the output signal from the differential amplifier and a predetermined voltage level of a drive voltage source in the node, and transmitting, with the transceiver in the node, an output voltage to the shared communication medium based on the correction voltage level to drive the voltage level of the shared communication medium to the predetermined reference voltage while the bit is being transmitted by the other node through the shared communication medium.

In another embodiment, a method of operating a node that includes a plurality of transceivers that are connected to a shared communication medium has been developed. The method includes operating, with a controller in the node, a multiplexer to control a plurality of transceivers in the node to transmit a plurality of bits to a shared communication medium simultaneously, the controller selecting the bits for transmission randomly, wherein at least one bit is a dominant bit for transmission through the shared communication medium.

DETAILED DESCRIPTION

Figure 1:
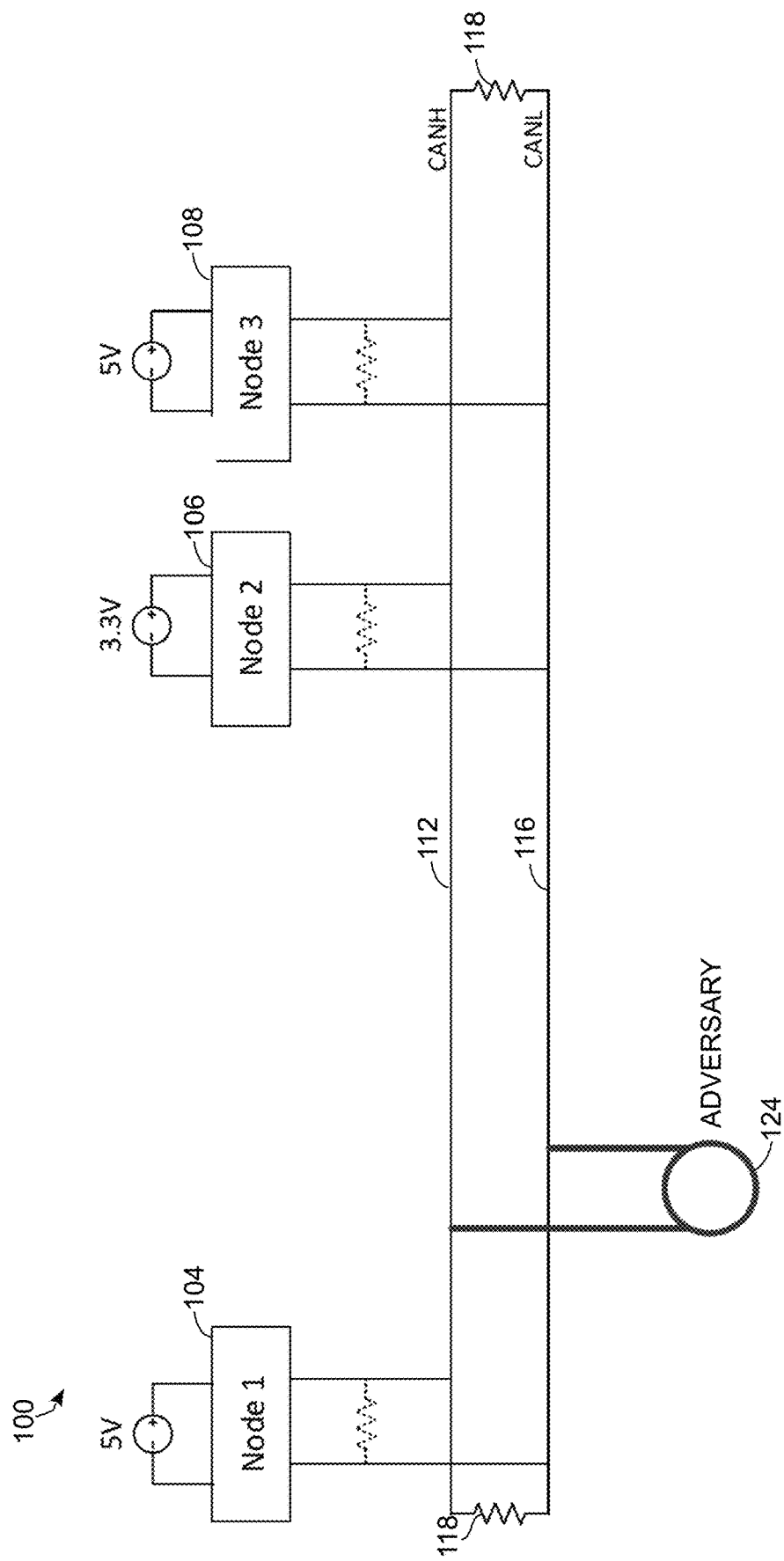
FIG. 1 is a diagram of a prior-art CAN bus system in which an adversary node measures electrical signals in the CAN bus to perform side-channel attacks.

For the purposes of promoting an understanding of the principles of the embodiments disclosed herein, reference is now be made to the drawings and descriptions in the following written specification. No limitation to the scope of the subject matter is intended by the references. This disclosure also includes any alterations and modifications to the illustrated embodiments and includes further applications of the principles of the disclosed embodiments as would normally occur to one skilled in the art to which this disclosure pertains.

As used herein, the term "bit" refers to a binary value that can have one of two discrete values, which are typically represented as a "0" or "1" in text. Communication systems generate signals with different voltage levels, phases, or other signal characteristics that represent the two values of a binary bit during transmission of data. As is well-known to the art, digital data includes a series of one or more bits that can represent numbers, letters, or any other form of data and, in particular, a set of bits can form a cryptographic key. As used herein, the terms "logical complement" or "inverse" as applied to binary values are interchangeable and refer to a set of data or an operation that changes the values of each bit of binary data (e.g. the binary sequence "101" is the logical complement of "010"). As described in more detail below, a protocol for secure key exchange leaves different nodes with sets of corresponding bits for shared keys that are logical complements of each other. Selected sets of the nodes perform an inversion operation so that all of the nodes have the same shared key.

As used herein, the term "key" or "cryptographic key" refers to a sequence of bits that two or more nodes in a communication network use to perform cryptographic operations including the encryption and decryption of data and for authentication of transmitted data. A "shared key" refers to a key that is known to two or more nodes that communicate with each other but the shared key is not otherwise known to third parties, including adversaries. The methods and systems described herein enable two or more nodes in a communication network to generate a shared key that an adversary cannot identify even if the adversary can monitor any communication that occurs between the nodes and is capable of performing the side-channel attacks that are described herein. After the shared keys are generated, the nodes perform cryptographic operations that are otherwise well-known to the art and are not described in greater detail herein.

As used herein, the term "shared communication medium" refers to a physical network connection and network communication protocol in which multiple nodes transmit and receive data in a manner where any transmission from a single node is received by all other nodes that are connected to the shared communication medium. In a shared communication medium, two or more nodes can transmit data simultaneously. The shared communication medium is considered an "insecure" or "untrusted" communication channel because an adversary is assumed to have the ability to monitor any and all communications that occur through the shared communication medium.

Two non-limiting examples of shared communication media include the Controller Area Network bus (CANbus) network communication bus and protocol and the I$^2$C bus. In both of these embodiments, all nodes that are communicatively connected to the shared communication medium can observe all signals that are transmitted through the communication medium, including signals that are not intended for receipt by a particular node. As described in more detail below, each node is a computing device that includes a transceiver configured to both transmit and receive signals through the shared communication medium to one or more additional nodes.

One class of side-channel attack is referred to in this document as a "voltage side-channel" attack that relies on precise measurements of the steady-state output voltages from different nodes in a CAN bus system to determine which node is transmitting a logical 0 or 1 when two nodes transmit data simultaneously using the techniques described above. The CAN bus system uses differential voltage for signals in which two nodes that transmit a logical 0 (high voltage) and logical 1 (low voltage) simultaneously, only one of the nodes produces a change in the voltage differential on the CANH and CANL wires. In most CAN embodiments, both the CANH and CANL wires are driven to a predetermined voltage level (e.g. 2.5V) by default and if the difference between the voltages on CANH and CANL is zero or within a predetermined operational threshold of zero then a transmissions is said to be "recessive", which corresponds to a logical 1 and the nodes connected to the CAN Bus detect the logical 1 based on the zero or low voltage differential. If, however, a node transmits a logical 0 then the node drives the CANH wire to a higher voltage level above 2.5V and the CANL wire to a lower voltage level below 2.5V. The differential in voltage between the CANH and CANL is easily detected by other nodes that are connected to the CAN bus to detect the logical 1 and 0 signals.

Figure 2A:
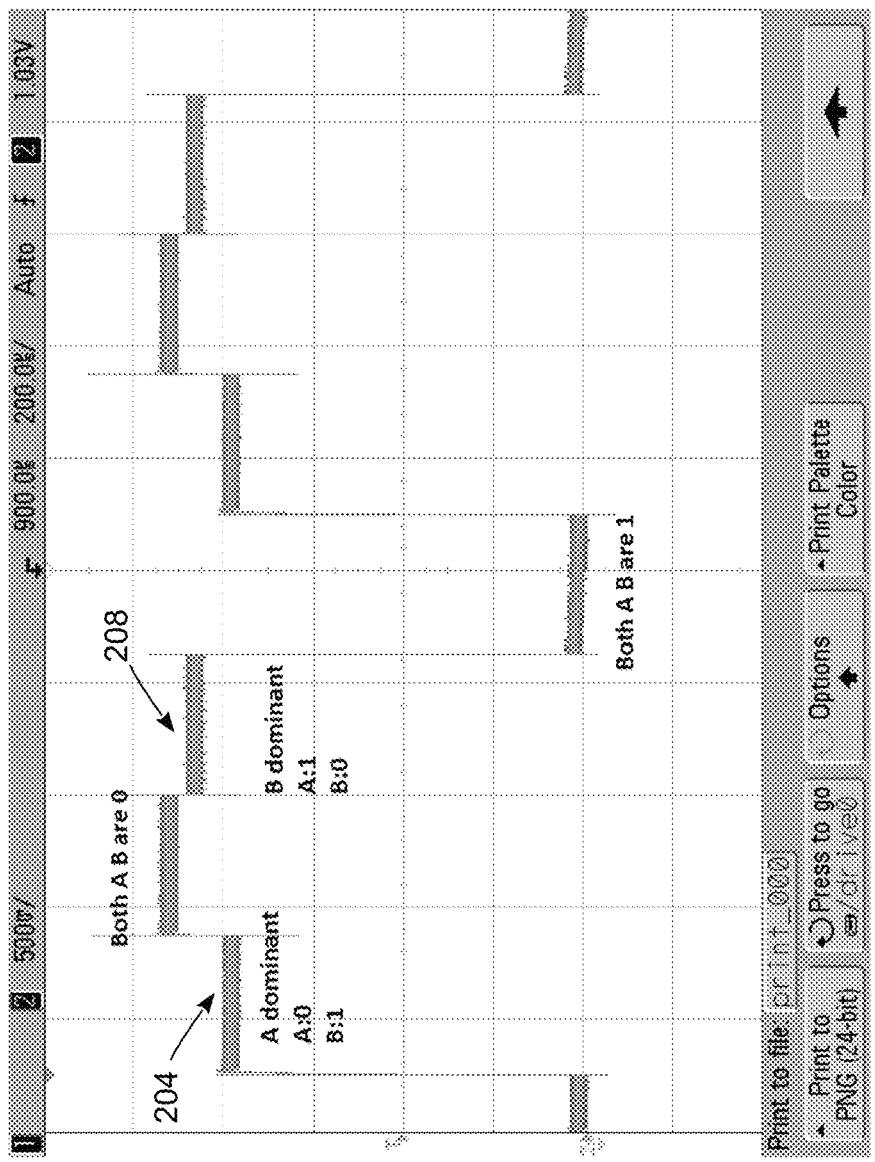
FIG. 2A is a diagram of voltage levels of transmitted signals from two different transceiver types that an adversary node observes in a prior-art CAN bus system.

As depicted in FIG. 1, individual nodes can and often do transmit data signals at different drive voltage levels, such as 5V for the node 104 and 3.3V for the node 106 in FIG. 1 and these types of transmission are fully supported in standard CAN bus configurations since node devices with widely varying electrical characteristics can all use the differential voltage signaling process without additional compensation circuitry. If two different nodes with two different drive voltage output magnitudes both transmit a logical 0 and 1 simultaneously, then a side-channel adversary with sufficiently sensitive voltage measurement hardware and a priori knowledge of the voltage levels of the nodes (which is not secret information) can determine which node transmits the logical 0 by simply measuring the absolute voltage differential that is produced by the node that transmits the dominant voltage signal, which corresponds to the logical 0. By process of elimination the adversary determines that the other node in the pair transmitted the recessive logical 1. Additionally, since the transmission sequence involves both nodes transmitting a randomly selected bit followed by the logical complement of the bit, both nodes will transmit a dominant bit with a logical 0 value during the pair of transmissions, which enables the adversary to compare the voltage levels of the two transmissions to identify the nodes based on the previously determined operating voltage levels. FIG. 2A depicts a voltage and time diagram that illustrates the properties of the CAN bus that enable the side-channel attack. The signal 204 depicts the dominant differential voltage level when two nodes A and B transmit simultaneously, and the node A is the dominant node that is configured with a lower drive voltage signal level compared to node B. The signal 208 shows the reverse situation in which A and B both transmit simultaneously, but node B is the dominant node that transmits with a higher drive voltage. An adversary node can measure the voltage differential level of the signals 204 and 208 and determine which of the two nodes, A and B, is transmitting the dominant bit due to the differences in drive voltage sources between the two different nodes.

In addition to voltage differences between nodes with different drive voltage levels, two transceivers with identical drive voltage levels can have different load resistances. Similar to the drive characteristics, this can lead to different voltages on the CANH and CANL lines when different transceivers are used. An adversary node utilizes this to identify the transmitter. For example, two embodiments of commercially available CAN bus transceivers are the MCP2551 and the TJA1040. The MCP2551 includes an operational load resistance to be 40Ω<RL<60Ω, whereas for TJA1040, the regulated load resistance is 45Ω<RL<65Ω. These differences cause a difference in transmission voltages that can help an adversary distinguish between the nodes.

Additionally, the differences between the locations of nodes along the CAN Bus and the location of the adversary node can produce potential leakage of information in a side-channel attack, even if the two CAN Bus transceivers operate with identical drive voltage and impedance levels. Even though the transmission characteristics of the two nodes are similar, an intermediate observer in the CAN bus, such as the adversary 124, may be able to detect differences in the signals due to the differences in the impedance of the network segment between the two transceivers and the intermediate location of the adversary. For a typical CAN bus scenario, several factors can contribute to these differences, such as different length of the wire connecting the two nodes to the adversary node, and different number of intermediate nodes, which cause identical signals transmitted by the two transceivers to be differentiable at such points. An adversary probing the bus at such points can thus identify the nodes when the nodes perform simultaneous transmission to exchange cryptographic keys as is described above.

Figure 2B:
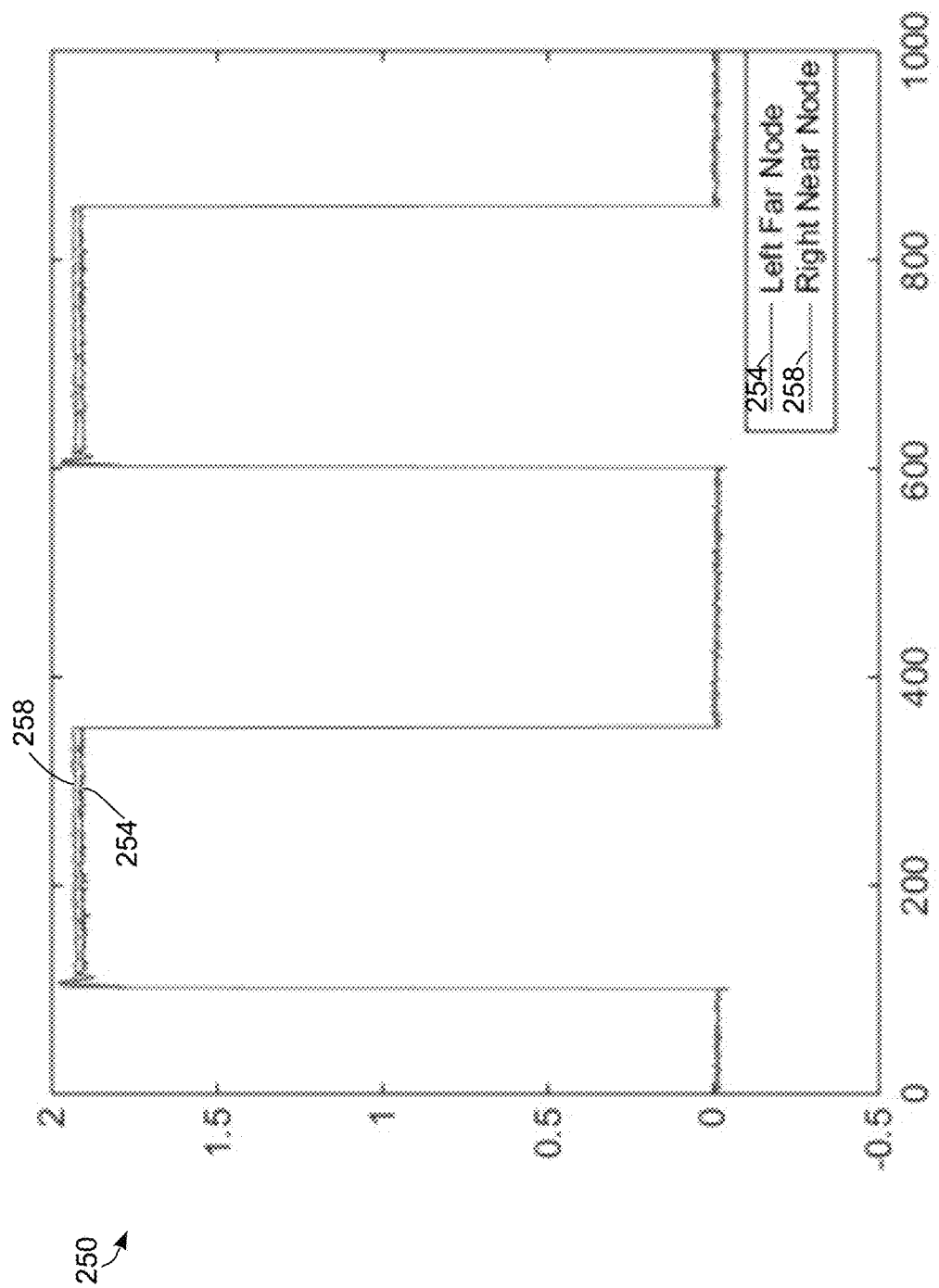
FIG. 2B is a diagram of voltage levels of transmitted signals from two transceivers of the same type that an adversary node observes in a prior-art CAN bus system.

For example, in the CAN bus network of FIG. 1, the nodes 104 and 108 both use the same transceiver (e.g. MCP2551) with a 5V drive signal and the same load impedance at the transceiver. However, different locations between the nodes 104 and 108 can exhibit different impedance levels relative to the two nodes 104 and 108 even if the nodes have the same configuration. For example, in one configuration the adversary node 124 is connected to an observation point on the CAN bus that is 1 meter closer to node 104 compared to node 108. FIG. 2B depicts a voltage diagram 250 that depicts the voltages detected by an observer from two identically configured transceivers as described above. The steady state voltage signals 254 and 258 exhibit small differences due to the unequal impedance levels in the CAN bus. Though this difference appears small, with repeated observations, the adversary node 124 can clearly distinguish between the transmissions of nodes 104 and 108 in FIG. 1, which can lead to leakage of secret data and cryptographic keys to the adversary node 154.

The information leakage described above occurs due to differences in the impedance characteristics, driver circuit and noise characteristics between different transmitters to a common observation point of the adversary node. This may stem from a variety of factors, and represents a fingerprint of a transceiver. The embodiments described herein minimize leakage to such an adversary. The information that the adversary can detect is obfuscate by controlled addition (or removal) of noise (or variability). In an ideal system, the distribution of the voltage observations due to any transmitting node should be similar, and the embodiments described herein provide several such countermeasures to achieve this goal. The different countermeasures require different degrees of change in existing bus architecture, and correspondingly, achieve varying degrees of leakage reduction.
Impedance Adjustment As described above, an adversary node can use the different impedance levels of CAN Bus nodes as part of a side-channel attack to detect the identity of the CAN bus node that transmits each signal when two CAN Bus nodes operate simultaneously. One technique to reduce or eliminate this information leakage is to adjust the impedance levels of nodes in the CAN bus in an unpredictable manner so the adversary node cannot reliably detect the identities of the nodes that transmit data when two nodes transmit simultaneously to transmit private data for cryptographic key exchange.

Figure 3:
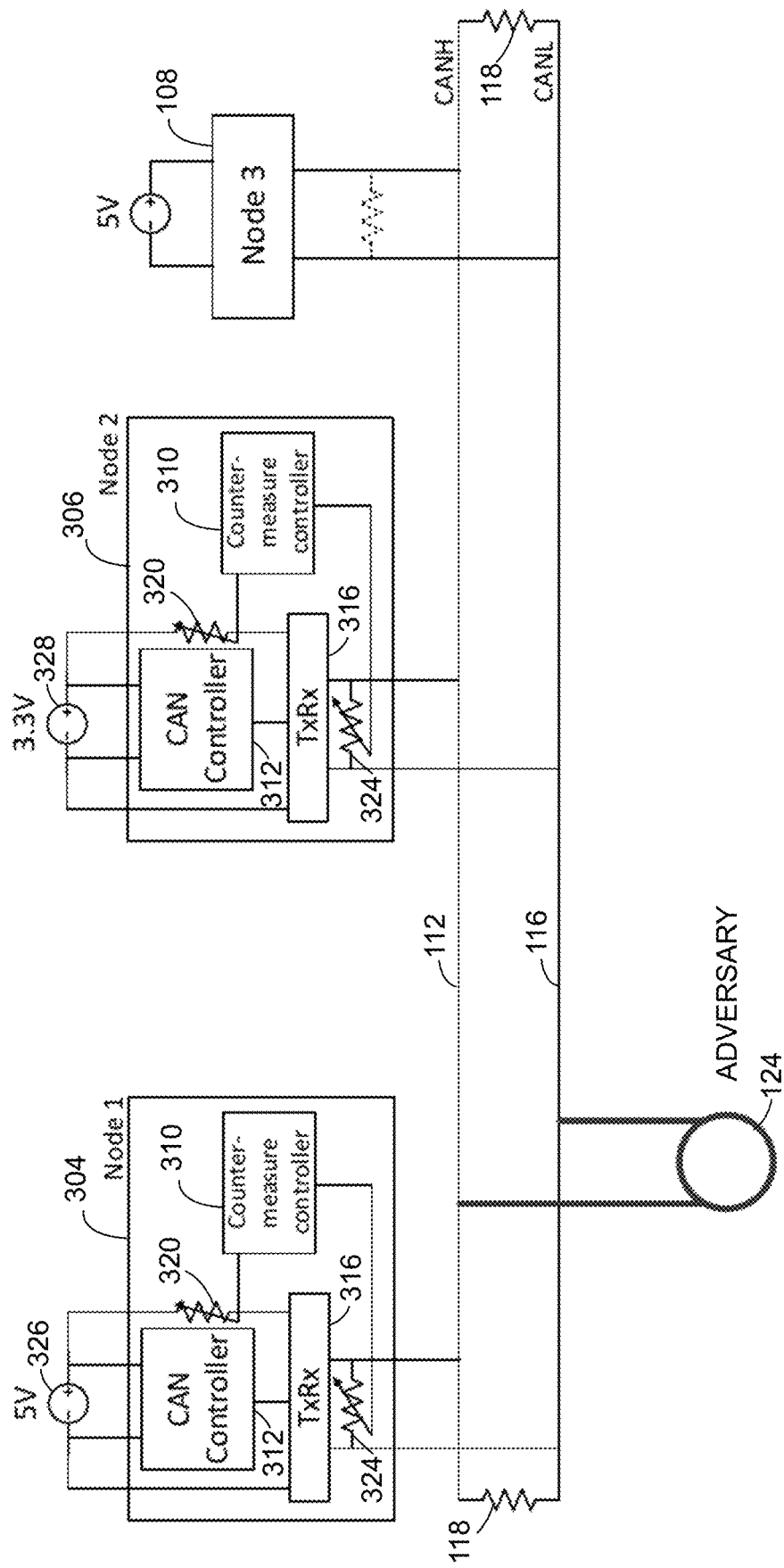
FIG. 3 is a diagram of a CAN bus system that includes nodes configured to introduce noise into transmission signals to prevent an adversary from performing voltage level side-channel attacks.

FIG. 3 is a schematic diagram of a CAN bus system 300 which includes nodes 304 and 306 that are specifically configured to reduce or eliminate the ability of an adversary to perform the voltage level side-channel attacks that are described above. Each of the nodes 304 and 306 includes a CAN Bus controller 312, which is typically a digital microcontroller, microprocessor, or other suitable digital logic device, and a CAN Bus transceiver 316. The node 304 includes a 5V drive voltage source ($V_{DD}$) 326 while the node 306 includes a 3.3V drive voltage source 328. The transceivers 316 in both of the nodes 304 and 306 are connected to the CANH conductor 112 and the CANL conductor 116 in a CAN Bus. In FIG. 3 the adversary node 124 is connected to the CAN Bus and attempts to distinguish which of the nodes 304 or 306 transmits the logical 0 and 1 signals when the nodes 304 and 306 transmit data simultaneously to perform secure exchange of cryptographic key data. FIG. 3 also depicts a prior art node 108 that can be connected to the CAN Bus, and the nodes 304 and 306 remain fully compatible with prior art CAN Bus nodes.

The nodes 304 and 306 each include a countermeasure controller 310 that is operatively connected to two variable resistors (potentiometers) 320 and 324. In the embodiment of FIG. 3, the countermeasure controller 310 is a digital logic device that controls the resistance levels of the potentiometers 320 and 324. The countermeasure controller 310 implements at least one of a hardware random number generator (RNG) or a pseudo-random number generator that provides randomized data. The countermeasure controller 310 produces random data using a predetermined random distribution, which is a uniform random distribution in the embodiment of FIG. 3 although other distributions may be used, and the random numbers are generated independently of each other so that the value of each randomly generated number is not affected by the values of previously generated random numbers. The countermeasure controller 310 uses the randomized data to generate control output signals to adjust the resistance levels of the potentiometers 320 and 324 to values within predetermined operational resistance ranges for the operation of the nodes in a randomized manner that cannot be predicted by the adversary node 124.

In each of the nodes 304 and 306, the potentiometer 320 is electrically connected to the drive voltage source (326 in node 304 and 328 in node 306) and the transceiver 316. The potentiometer 324 is connected between the outputs of the transceiver 316, where the outputs connect the transceiver 316 to the CANH conductor 112 and the CANL conductor 116.

The potentiometers 320 and 324 include digital potentiometers that can be controlled by output signals from the countermeasure controller circuit 310 and are adjusted at a high rate of speed to enable efficient operation in the CAN bus system 300. While FIG. 3 depicts the countermeasure controller 310 as a separate device for illustrative purposes, in some embodiments the countermeasure controller is implemented using hardware and software in the CAN controller 312 or another digital logic device in each of the nodes 304 and 306.

In FIG. 3, the resistance level of the potentiometer 320 affects the total output voltage of signals that are transmitted from the transceiver 316 in the nodes 304 and 306. In one configuration, the nodes 304 and 306 transmit the default voltage levels of the voltage sources 326 and 328 to the other nodes in the CAN bus either expressly in a message frame or implicitly since by default the transceivers transmit signals based on the voltage level of the drive source, where most transceiver embodiments generate output signals with voltage levels that are at most somewhat lower than the drive voltage level. During an operation when each node does not need to obfuscate the source of transmitted signals, the potentiometer 320 is set to zero resistance and the transceivers 316 operate at the nominal voltage levels provided by the drive voltage source in each node.

During an operation in which two nodes transmit bits simultaneously to exchange secret data, the countermeasure controller 310 in each of the nodes 304 and 306 sets the resistance level of the potentiometer 320 in the node that transmits the dominant voltage level (e.g. the node that transmits the logical 0) to a randomly selected level within a predetermined resistance range. The predetermined resistance range is selected so that both nodes generate dominant signals at a voltage level that is within the operational range of both nodes. The resistance level of the potentiometer produces a reduction in voltage that the transceiver receives from the voltage source that increases as the resistance level of the potentiometer increases as is well known to the art, and the countermeasure controller 310 in each node is configured to adjust the resistance value of the potentiometer 320 differently based on the predetermined supply voltage level in each node and the operational voltage range of the transceiver. During simultaneous transmission operations, the countermeasure controller 310 in each of the nodes 304 and 306 randomly sets the value of the potentiometer 320 so that both nodes produce dominant output signals that are randomly generated within with voltage levels that are within a valid voltage range for CAN bus transmissions. Consequently, the nodes 304 and 306 are configured to reduce the ability of the adversary to perform the attack that is depicted in FIG. 2A since during simultaneous transmission both nodes generate output signals that add randomization to the voltage levels of the transmitted signals. The node that transmits the non-dominant voltage signal (e.g. the logical 1) transmits at a default voltage level that is generally the same for all nodes in the CAN bus network even if the supply voltages differ between nodes, although the node that transmits the non-dominant bit is optionally configured to adjust the potentiometer 320 to provide random changes to the absolute voltage level of the non-dominant output signal within a predetermined voltage range (e.g. 2.4V to 2.6V or any other operable voltage within the CAN bus standard) as well.

In addition to the potentiometers 320, the nodes 304 and 306 of FIG. 3 include the potentiometers 324 that adjust the effective load resistance seen by the transceivers 316 when connected to the CAN bus. The observed voltage on the bus is a function of the overall impedance of the network and the drive voltage. In a practical automotive network, the CAN bus is modeled using a distributed element model with a nominal impedance of 120Ω. Thus any impedance variation can cause a change in voltage level at an observer due to several reasons. Firstly, the change of effective bus load would cause a different voltage drop. Secondly, due to impedance mismatches, there would be reflections, amplification and attenuation of the signal at the variation points.

In a high speed operating scenario, such variations can influence the robustness of the CAN bus and cause errors at the receivers. Consequently, during standard CAN bus operation the potentiometers 324 are disconnected from the transceiver outputs to enable the CAN bus to operate with nominal impedance. However, during the specific operations in which two nodes transmit data simultaneously to exchange cryptographic key data, the CAN bus can operate at a sufficiently low speed to enable the potentiometers 324 to adjust the effective load impedance while still enabling communication between the two simultaneously transmitting nodes while reducing or eliminating the ability of the adversary 124 to perform side-channel attacks. During operation the countermeasure controller 310 adjusts the potentiometer 324 in each of the nodes 304 and 306 to produce a randomly selected resistance level that adjusts the load resistance level.

Table 1 depicts voltage output levels on a CAN bus for different transceivers with varying levels of load resistance.

| | Load Resistance (Ω) | | | | | | | | |
|---|---|---|---|---|---|---|---|---|---|
| | 180 | 120 | 100 | 90 | 80 | 70 | 60 | 50 | 40 |
| Type A | 1.9764 | 1.9321 | 1.9076 | 1.8901 | 1.8780 | 1.8512 | 1.8159 | 1.6604 | 1.3948 |
| Type B | 2.2697 | 2.1319 | 2.0537 | 1.9987 | 1.9678 | 1.8849 | 1.7886 | 1.6724 | 1.4986 |

Figure 7:
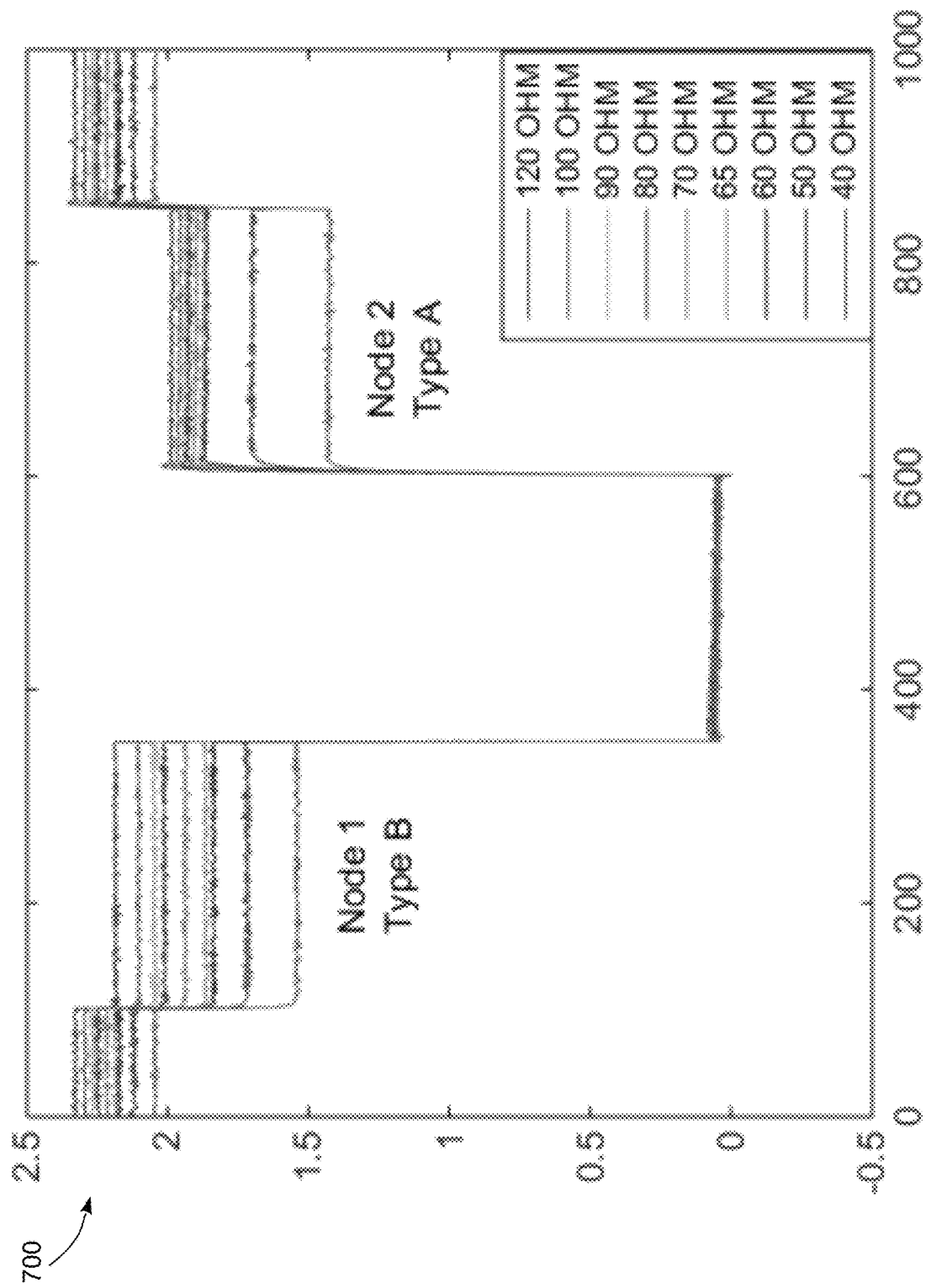
FIG. 7 is a graph depicting voltage levels generated during transmission of data bits by producing different resistance levels of a potentiometer in a node to adjust an impedance level of a CAN bus.

While Table 1 depicts ten distinct load resistance values for illustrative purposes, the countermeasure controller 310 can operate the potentiometer 324 to produce a much larger number of distinct load resistance levels within the predetermined operational load resistance range. FIG. 7 depicts a graph 700 of the observed voltage levels generated by two different types of nodes at an observer in the CAN bus using the different load resistance levels that are depicted above in Table 1. In FIG. 7, the "Type A" node uses a commercially available MCP2551 transceiver and the "Type B" node uses the commercially available TJA1040 transceiver. The configurations of the nodes 304 and 306 in the system 300 of FIG. 3 enable the countermeasure controller 310 to produce a wide range of randomized voltage output levels by adjusting the load resistance with the potentiometer 324. This randomization of the voltage level prevents the adversary 124 from performing side-channel voltage attacks that are similar to those described in conjunction with FIG. 2B above.

Different methods of operation of the nodes 304 and 306 in the system 300 reduce or eliminate the ability of the adversary 124 to identify the nodes that transmit the logical 0 and 1 signals when two nodes operate simultaneously by adjusting the effective load impedance in a randomized manner. The techniques include individual node resistance variation and group resistance variation.

In individual resistance variation, the countermeasure controller 310 in each node adjusts the resistance level of the potentiometer 324 in a random manner at least once per bit transmission including, for example, prior to and one or more times during the transmission of each bit as described above. The countermeasure controller 310 includes a memory or is connected to a memory that stores a predefined lookup table similar to Table 1 above that characterizes the voltage variations produced by different resistance levels. Since for a typical CAN scenario, the impedance of the network as observed by a transceiver would be similar, the profile can be used without tuning across CAN networks.

As described above, the nodes are configured to operate within a minimum and maximum voltage range $V_D^{min} \leq V_D \leq V_D^{max}$. Each node i identifies a range of resistance values $R_{min}^i \leq R_L^i < R_{max}^i$ with suitable resistance levels that produce a desired voltage output for dominant bit (e.g.

logical 0) transmissions. The countermeasure controller 310 in each node generates a randomly and independently sampled value that is selected using a uniform random distribution in one embodiment to generate a resistance value from the range: $D^i(R_{min}^i, R_{max}^i)$ where $D^i$ denotes the uniform random distribution of resistance values that also produce a randomly uniform set of output voltages. The resistance values that produce a uniform set of output voltages may not be purely uniformly selected because the potentiometer 324 is connected in parallel with other resistors the components of CAN bus itself and the effective resistance levels of the other nodes that are connected to the CAN bus, which means that the output voltage may not change linearly with changes to the resistance level of the potentiometer. In some embodiments, the countermeasure controller 310 uses a mapping between the resistance values and the effective output voltage levels to select resistance values that produce uniformly random variations in the output levels even if the resistance values are not selected with a uniform random distribution. The mapping is determined empirically and can be stored in a memory of the countermeasure controller 310 or another memory device in the node.

In group resistance variation, a group of the nodes that are connected to the CAN bus adjust the load resistance levels in a randomized manner to adjust the overall impedance level of the CAN Bus in a randomized manner so that even nodes that do not include the additional features of the nodes 304 and 306, such as the prior art node 108 of FIG. 3, can experience some benefits against side-channel attacks. This configuration is also referred to as a "jamming" configuration in which one or more of the "jammer" nodes that have a potentiometer connected to the CAN bus adjust the potentiometer in a randomized manner for each bit transmission that occurs between two nodes that transmit data simultaneously for secret communication even if the jammer nodes do not transmit any data themselves, which also affects the impedance level of the CAN Bus in a randomized manner and reduces or eliminates the ability of the adversary 124 to perform a voltage side-channel attack even if one or both of the transmitting nodes is a prior art node that does not include the additional features of the nodes 304 and 306 in FIG. 3. The jammer nodes do not need to synchronize the random operation of the potentiometers to the nodes that are actually transmitting bits during a cryptographic key exchange process, and the jammer nodes may operate the potentiometer at a rate that exceeds the rate of data transmissions through the CAN bus to introduce additional random variations in resistance and the corresponding voltage levels that are observed by the adversary 124.

In the group resistance configuration, the jammer nodes operate with a randomized potentiometer configuration that prevents the total impedance level of the CAN Bus from being altered to the point that communication through the CAN Bus becomes unreliable. This may limit the range of variation for the potentiometer setting in each individual node in the 'jammer' set. However, the collective influence of such variations can cause sufficient obfuscation for an adversary. In one example for a given number of M jammer nodes, each node can choose from only two distinct load impedances, and the collective variation results in $2^M$ levels. However, realistically, due to similarities in impedance scenarios, the jammer nodes produce a smaller number of distinct impedance levels. However, this can be adjusted by choosing a distinct value of load resistances for each node and having $2^M$ distinct levels for each of the nodes that are assisted by the jammer nodes.

Voltage Feedback Loops

In another embodiment, nodes in a CAN Bus are configured with voltage feedback hardware that enables the nodes in the CAN bus to reduce distinguishable differences in the voltage levels between two transmitting nodes to a point at which the adversary node cannot practically determine which node transmits a logical 0 or 1 when both nodes transmit data simultaneously followed by the transmission of the logical complements. This may be achieved by driving the bus lines to a shared reference value during transmission, i.e. regulating the CAN bus voltage. This can be implemented via a feedback mechanism that samples the bus output and drives the output to a common reference by adjusting the transmitter characteristics. Such a feedback mechanism, added to even a single node in a CAN bus network can drive the CAN Bus to a predetermined voltage level for both dominant transmission and non-dominant transmission bits to reduce the ability of the adversary to detect smaller inconsistencies in the transmitted voltage level s from different individual nodes that are connected to a CAN bus.

Figure 4:
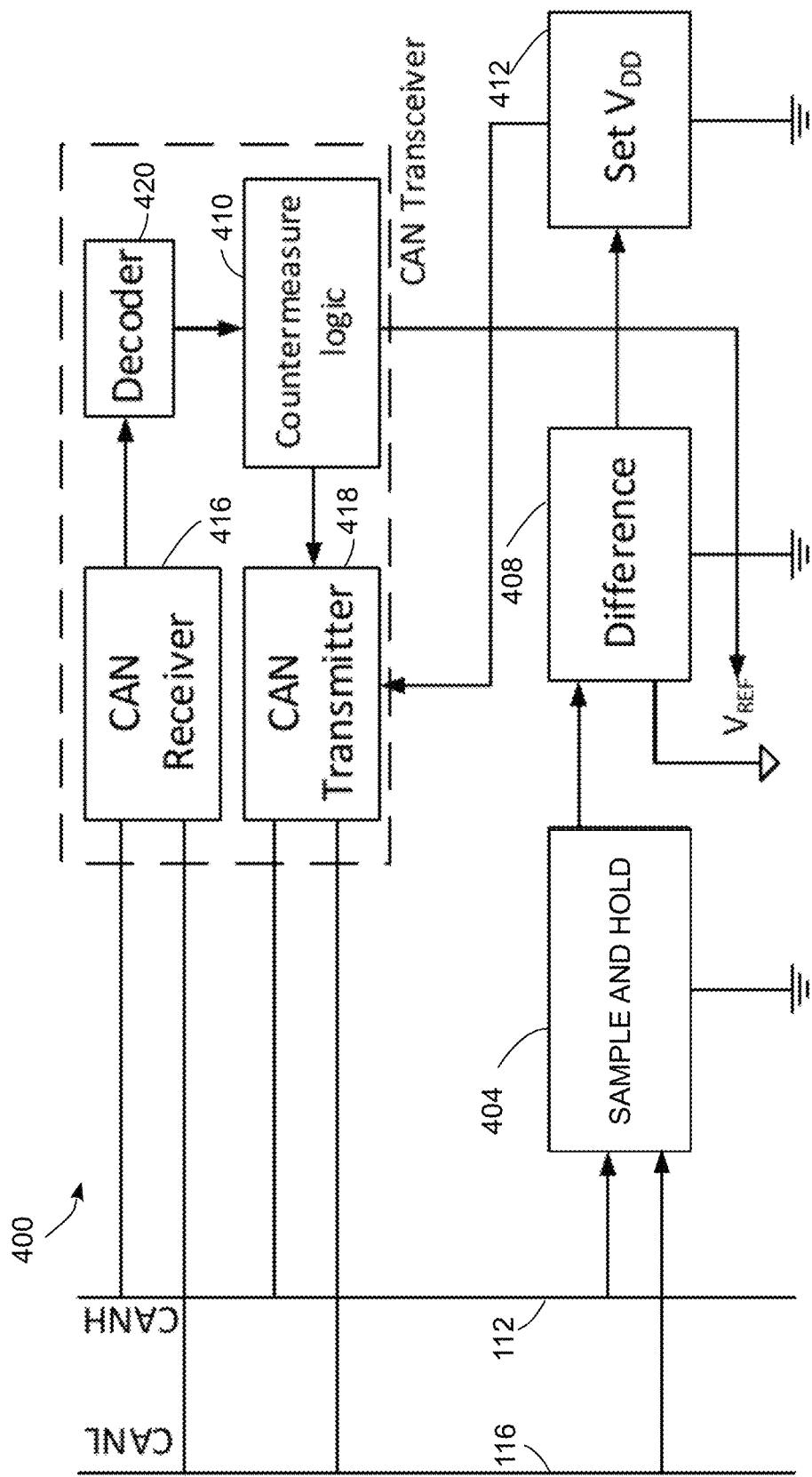
FIG. 4 is a diagram of a node that can be connected to a shared communication medium to drive a voltage level of signals that are transmitted through the shared communication medium by other nodes to a predetermined voltage level.

FIG. 4 depicts an example of a node 400 that is connected to a CAN bus to provide voltage feedback signals that reduce the ability of an adversary to perform voltage based side-channel attacks. The node 400 includes a sample-and-hold circuit 404, a difference circuit 408, a voltage regulation circuit Set $V_{DD}$ 412, and a CAN transceiver block that further includes a countermeasure logic device 410, a CAN receiver 416, a CAN transmitter 418, and a decoder circuit 420. In some embodiments, the node 400 is also a device that uses the CAN bus for communication while in other embodiments the node 400 is dedicated to providing the voltage feedback to the CAN Bus.

Figure 8:
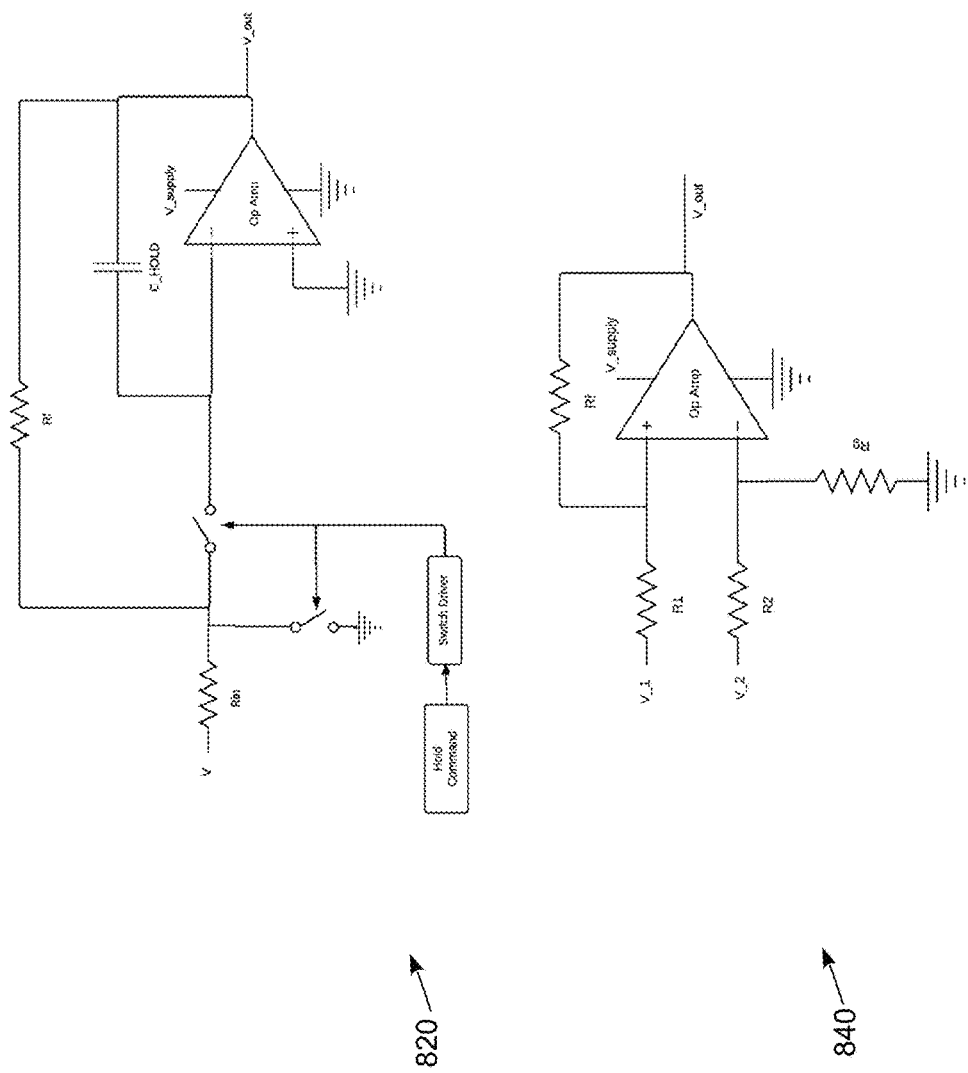
FIG. 8 is a circuit diagram depicting prior-art embodiments of a sample-and-hold circuit and a differential amplifier that can be incorporated into the node of FIG. 4.

In the node 400, the sample and hold circuit 404 samples the voltage level from both lines of the CAN bus at a predetermined sampling rate that is fast enough to measure changes to the voltage levels in the CANH and CANL conductors of the CAN that occur during bit transmissions from other nodes in the CAN Bus. FIG. 8 depicts a circuit diagram 820 of one example of the sample and hold circuit, and sample and hold circuits are generally known to the art. At each clock cycle of the sampling frequency, the sample and hold circuit first samples the CANH and CANL data in the CAN bus with respect to a given reference. The reference can be the internal ground of the transceiver. If an analog-to-digital converter is used is used, the ADC is implemented with a sufficiently high resolution (typically on the order of mV or higher precision) for precise voltage control at the same resolution or higher than the expected sensitivity of an adversary node.

The difference circuit 408 calculates the difference in the sampled voltage received from the sample and hold circuit 404 on the CAN bus line (in either CANH or CANL) with the reference voltage. The gain of the difference circuit is set depending on the configuration of the summing amplifier and inverting amplifier in Set $V_{DD}$ 412. In one embodiment, a differential amplifier implements the difference circuit although other circuit embodiments may implement the difference circuit as well. FIG. 8 depicts a circuit diagram 840 of one embodiment of a differential amplifier and differential amplifiers are generally known to the art.

The Set $V_{DD}$ block 412 is a voltage regulation circuit that, in one embodiment, includes a summing amplifier and an inverting amplifier that calculates a correction voltage to be generated by the transmitter 418 in the transceiver based on the output of the difference circuit 408 added to the value of the drive voltage source $V_{DD}$ (not shown) in the node 400.

In one configuration the node 400 operates with a linear relationship between the drive voltage source and the peaks of CANH and CANL, and the Set $V_{DD}$ is implemented using the summing amplifier and inverting amplifier. The summing amplifier receives a reference voltage from the drive voltage source of the node 400 (5V in one embodiment) and the output of the difference circuit, and generates a sum of the inputs. The inverting amplifier inverts the output result from the summing amplifier to provide a feedback value for the node 400 to generate an output voltage that drives the detected sum towards zero. Note that in this case the gain of the difference circuit is same as the slope of the CANH/CANL vs. VDD curve. The node 400 includes a voltage source $V_{DD}$ (not shown in FIG. 4) that is configured to have at least the largest voltage level of any other node that is connected to the CAN Bus to enable the node 400 to provide voltage feedback levels over the full range of operational voltages that are transmitted through the CAN Bus.

The countermeasure logic device 410 is a digital logic device that is integrated with a CAN transceiver in the node 400 but can be a separate digital logic device in other embodiments. The countermeasure logic device 410 performs two functions. First, the countermeasure logic device 410 utilizes the current CAN bus level to detect when a bit is transmitted through the CAN bus. The CAN receiver 416 and decoder 420 provide a digital output for the CAN bus that enables the countermeasure logic device 410 to determine if a data bit, and a dominant voltage logical 0 data bit in particular, is being transmitted through the CAN bus. For scenarios where a bit is transmitted, the countermeasure logic device 410 provides the reference voltage level for stabilization, and the CAN transmitter 418 transmits at a voltage level corresponding correction voltage from the output of the Set $V_{DD}$ circuit 412 to provide the voltage feedback signal to the CAN Bus. The countermeasure logic device 410 maintains bit timing to ensure that the countermeasure voltage feedback signal is transmitted only for the duration of a single bit transmission through the CAN bus, where the duration is set by the transmission speed of the nodes that are connected to the CAN bus. Further, countermeasure logic device 410 maintains a sufficient gap between successive transmissions to allow the active nodes to transmit additional bit values on the CAN bus and for additional bit values to be correctly sampled by the receiver circuit.

As described above, the voltage feedback loop embodiment of FIG. 4 drives the CAN bus to a predetermined voltage reference value whenever two nodes in the CAN Bus transmit data to reduce the opportunity for an adversary to perform voltage side-channel attacks based on smaller differences in the observed voltage levels in the transmitted signals from different nodes. The voltage feedback loop embodiment depicted in FIG. 4 can be combined with the countermeasure controller and potentiometers that are described above in conjunction with FIG. 3.

Using Multiple Transceivers for Signal Obfuscation

In another embodiment, a CAN bus system includes nodes that employ multiple transceivers either within individual nodes or between different nodes that are connected to the CAN bus to reduce or eliminate the ability of an adversary to conduct a voltage side-channel attack when two nodes transmit logical 0 and 1 bits followed by the transmission of the logical complements simultaneously through the CAN bus.

Figure 5:
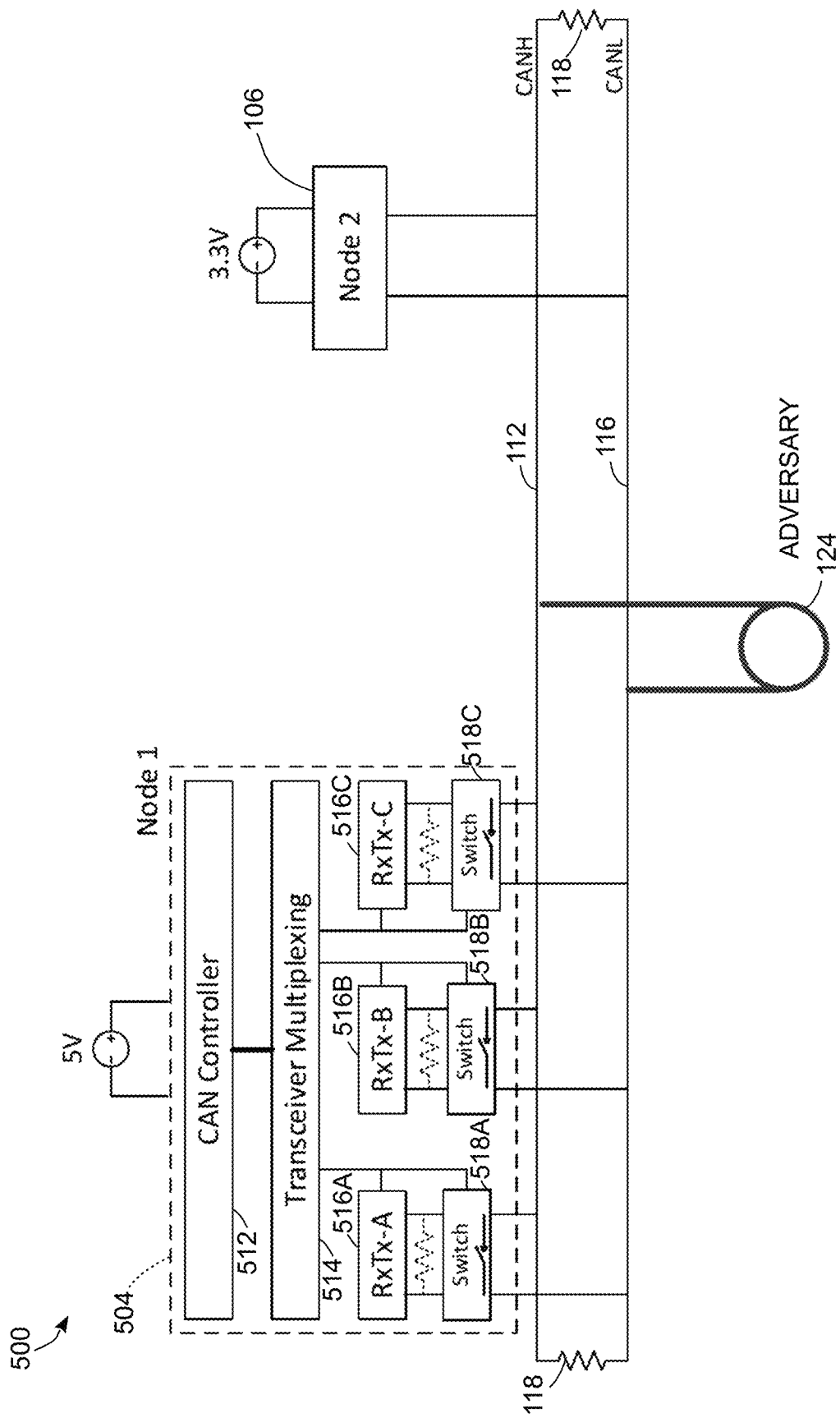
FIG. 5 is a diagram of a node that includes a plurality of transceivers that can transmit multiple bits in a CAN bus simultaneously to prevent an adversary from performing voltage level side-channel attacks.

FIG. 5 depicts one embodiment of a CAN bus system 500 that includes a node 504 with a CAN controller 512, a transceiver multiplexer 514, a plurality of CAN transceivers 516A-516C, and switches 518A-518C that are connected to the outputs of each of the CAN transceivers 516A-516C, respectively. While FIG. 5 depicts three transceiver 516A-516C and corresponding switches 518A-518C, alternative embodiments can include two or more transceiver/switch elements. As described in further detail below, the CAN controller 512 is a digital logic device that operates the transceiver multiplexer 514 to use one or more of the transceivers 516A-516C to transmit data bits through the CAN bus simultaneously. The transceiver multiplexer 514 is a circuit that selects data bits (e.g. 0 or 1) for transmission from each of the transceivers 516A-516C based on command signals from the CAN controller 512 and ensures that the transceivers 516A-516C transmit the selected bits simultaneously. The switches 518A-518C provide optional electrical isolation to disconnect transceivers from the CAN bus when the transceivers are not in use, and examples of suitable switches include, but are not limited to, solid state relay switches. The node 504 is connected to a CAN bus that includes the CANH conductor 112 and the CANL conductor 116 and terminating resistors 118. The CAN bus system 500 also includes a prior art node 106 that communicates with the node 504 through the CAN bus and an adversary 124 that attempts to perform voltage side-channel attacks when the node 504 and the node 106 transmit logical 0 and 1 bits simultaneously through the CAN bus to perform a cryptographic key exchange process.

Figure 6:
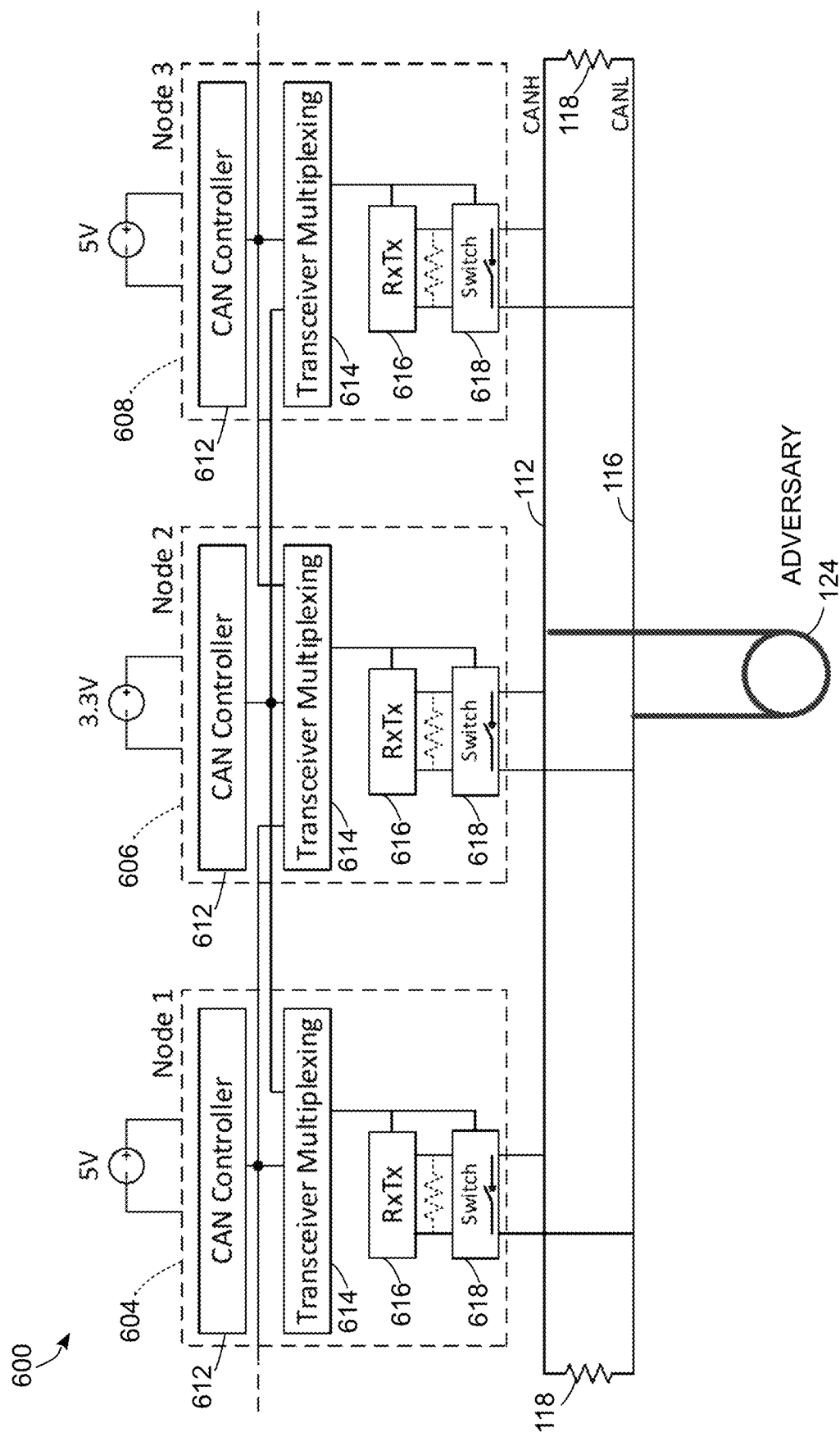
FIG. 6 is a diagram of a plurality of nodes that are connected to a CAN bus in which the plurality of nodes can transmit multiple bits in the CAN bus simultaneously to prevent an adversary from performing voltage level side-channel attacks.

FIG. 6 depicts another embodiment of a CAN network 600 that includes three separate nodes 604, 606, and 608. Each of the nodes includes a CAN controller 612 that is connected to a transceiver multiplexing device 614. The transceiver multiplexing device 614 is connected to a transceiver 616 and a switch 618 that is connected to the outputs of each the CAN transceiver 616. In the configuration of FIG. 6, the transceiver multiplexing devices 614 in the nodes 604, 606, and 608 are connected to each other via a communication channel that is independent of the CAN bus to enable multiplexing of transmission signals using multiple nodes that each include a single transceiver while the node 504 of FIG. 5 performs multiplexing using multiple transceivers in a single node. The switch 618 in each of the nodes 604-608 provides optional electrical isolation to disconnect the transceiver from the CAN bus when the transceivers are not in use. The nodes 604-608 are connected to a CAN bus that includes the CANH conductor 112 and the CANL conductor 116 and terminating resistors 118. The network 600 also includes an adversary 124 that attempts to perform voltage side-channel attacks when any two of the nodes 606-608 transmit logical 0 and 1 bits simultaneously through the CAN bus to perform a cryptographic key exchange process.

In the embodiments of FIG. 5 and FIG. 6 and in general CAN Bus systems, the voltage observed by the adversary 124 is a function of strength of the current source and impedance of the network between the observer and the current source. For a non-uniform network, this directly relates to the physical positions of source and the observer. One method to obfuscate the observations by an adversary modifies these positions for every transmission, but this process is note practical in a traditional wired network such as the CAN bus. However, the embodiments of FIG. 5 and FIG. 6 achieve a similar effect by using a random number of current sources, located at different points in the network, for each transmission of the dominant bit.

Table 2 depicts voltage output levels for simultaneous dominant bit transmissions from multiple transceivers, where the multiple transceivers may be in a single node as in FIG. 5 or in multiple nodes as in FIG. 6. The data in Table 2 were generated based on observations of the operation of three different CAN bus transceivers including a MCP2551 for node 1, a TJA1040 for node 2, and a TJA1041 for node 3, but similar results are applicable to other transceiver embodiments. More generally, N transceivers can generate up to $2^N-1$ distinct voltage levels, although in some configurations the practical number of voltage levels is somewhat less than $2^N-1$. The nodes in FIG. 5 and FIG. 6 generate the outputs below in a randomized manner. For the single node embodiment of FIG. 5, the node 504 generates any of the entries in the table except for the final entry (1, 1, 1) when transmitting a dominant logical 0 bit simultaneously to transmission of another bit from the node 106 since only one logical 0 output is needed for the aggregate transmission to be a logical 0. To transmit a logical 0, the CAN controller 512 in the node 504 generates a random control value and operates the multiplexer 514 and the individual transceivers 516A-516C based on the random control value to transmit a randomly selected set of bits from the transceivers 516A-516C simultaneously. The node 504 uses the final entry to transmit all recessive bits (logical 1) when the node 504 transmits a recessive bit.

| Node 1 bit | Node 2 bit | Node 3 bit | Voltage Output (V) |
|---|---|---|---|
| 0 | 0 | 0 | 2.4230 |
| 0 | 0 | 1 | 2.1281 |
| 0 | 1 | 0 | 2.1197 |
| 0 | 1 | 1 | 1.8208 |
| 1 | 0 | 0 | 2.3400 |
| 1 | 0 | 1 | 1.7710 |
| 1 | 1 | 0 | 1.7629 |
| 1 | 1 | 1 | 0.0000 |

In addition to variation in the number of simultaneously transmitting sources, changing the total number of nodes that are connected to the CAN bus that act as sinks in a random manner varies the observation by an adversary. In the traditional setting, each node on the bus that is not transmitting acts as a sink, and this characteristic is used in "jammer node" embodiments described above with reference to FIG. 3 where the varying load impedance levels of even non-transmitting nodes can reduce the effectiveness of side-channel voltage attacks. Disconnecting nodes from the CAN bus entirely in a random manner changes the total number of sinks that are present in the CAN bus, which also affects the total load impedance level. Thus, the embodiments of FIG. 5 and FIG. 6 vary the number of sinks on the bus by adding the capability of electrical isolation of non-participating nodes using the switches 518A-518C and 618. Thus any transceiver with such a capability may be in 3 distinct modes (tri-state), which are: 1. transmitting a dominant signal, 2. transmitting a recessive bit or passively affecting the load impedance of the CAN Bus, or 3. electrically isolated.

Table 3 depicts the voltage observations of the adversary for different states of the tri-state nodes. Using the tri-state operating mode with optional isolation of transceivers, the embodiments of FIG. 5 and FIG. 6 produce $3^N-2^N$ levels for N transceivers. Table 3 depicts the voltage output for simultaneous dominant bit transmissions by multiple nodes with additional electrical isolation, where isolated nodes are referenced with an "X":

| Node 1 bit | Node 2 bit | Node 3 bit | Voltage Output (V) |
|---|---|---|---|
| X | 0 | 0 | 2.5842 |
| X | 0 | 1 | 2.1174 |
| X | 1 | 0 | 2.0923 |
| 0 | 0 | X | 2.3159 |
| 0 | 1 | X | 1.9647 |
| 1 | 0 | X | 2.1493 |
| 0 | X | 0 | 2.2957 |
| 0 | X | 1 | 1.9599 |
| 1 | X | 0 | 2.1415 |
| 0 | X | X | 1.9590 |
| X | 0 | X | 2.1449 |
| X | X | 0 | 2.1230 |

In one embodiment, the CAN controller 512 includes or is connected to a memory that stores one or more lookup tables with control values for each of the transceivers 516A-516C and the switches 518A-518C that encode the information depicted above in Table 2 and Table 3. To transmit a dominant bit, the CAN controller 512 selects an entry from the table randomly to control the simultaneous transmission of different bits from the transceivers 516A-516C. In the embodiment of Table 3, the CAN controller 512 also optionally disconnects one or more of the transceivers 516A-516C from the CAN bus by sending commands to the transceiver multiplexer 514 to open the switches 518A-518C based on the randomly selected entry from Table 3.

The systems described herein can operate in the following modes including a multiple transceivers per controller operating mode, a multiplexed transceiver per controller operating mode, and as helper nodes. These modes are each described in further detail below.

In the multiple transceivers per controller embodiment that is depicted in FIG. 5, at least one node includes multiple transceivers that can operate simultaneously. Since the signal characteristics are determined by the number of active transceivers, each node (or CAN controller) is configured with multiple transceivers as is depicted in FIG. 5. For each dominant transmission, the controller can select any combination of transceivers to transmit the bit. Let us assume that each controller is equipped with N transceivers. If one or more of the transceivers are equipped with isolation circuits, then each of the transceivers may utilize a maximum of $3^N-2^N$ states for dominant transmission. Each transmitter transmitting a recessive bit may utilize $2^N-1$ states for recessive bit transmission. Thus, each simultaneous transmission between nodes in which one node transmits a 0 and the other node transmits a 1 is selected at random from $(3^N-2^N)(2^N-1)$ states. For example, even in a system that includes just 2 transceivers per controller, the adversary may observe 15 different voltage levels for each transmission.

In the multiplexed receivers per controller operating mode of FIG. 6, the transceiver multiplexing circuits of different nodes are connected together to enable multiple nodes to transmit data in a similar manner to the multiple transceivers in a single node as depicted in FIG. 5. The embodiment of FIG. 6 includes additional communication links between the transceiver multiplexing circuits 614, which transmit command signals that control the operation of multiple nodes simultaneously to enable multiple nodes to transmit the same groups of signals that are described above in tables 2 and 3.

In the helper nodes operating mode, the addition of transceivers using the embodiments of FIG. 5 or FIG. 6 enables fine grained control of transmit characteristics for each bit. However, this can cause significant overhead for nodes or may require network redesign. A similar effect may be achieved by enabling the nodes connected to the network to cooperate with the transmitting nodes. A node cooperating with a transmitter adjusts its own transmission state based on the observed bus transmission. If each node has the added capability of isolating itself from the network (state 'X'), the nodes may adopt a strategy using passive assist or active assist.

In passive assist, an idle node that does not need to observe signals on the CAN bus operates the switch to isolate its transceiver (i.e. the 'X' state), based on the output of a random number generator implemented in software or hardware in the CAN controller. Any node that includes a switch and control logic to electrically isolate the transceiver in the node from the CAN bus can perform the passive assist mode independently of the other nodes in the CAN bus.

In active assist, a node monitors the CAN bus by sampling the bus at a high frequency. If it detects a transition from recessive to the dominant state, it can choose to actively assist the transmitter randomly based on the output of a random number generator. Otherwise, the node performs the passive assist described above. In the active assist mode, a node assists the transmitter of the original signal by instantly transmitting the dominant signal for the remainder of the bit duration. For implementations of CAN bus in which a node is aware of the expected bus transmissions (e.g. group key scenarios in which more than two nodes perform a cryptographic key exchange process), the active assistance may be provided without sampling the bus, by simply transmitting a dominant signal during the predicted dominant bit periods.

The embodiments describe above for using multiple transceivers to reduce the ability of an adversary to perform voltage side-channel attacks are fully compatible with all of the other embodiments that are described above with reference to the nodes of FIG. 3 and the voltage feedback node of FIG. 4. In particular, the switches 518A-518C and 618 that are depicted in FIG. 5-FIG. 6 can be integrated into the nodes 304 and 306 of FIG. 3 to enable the countermeasure controllers 310 to operate the switches and isolate the nodes from the CAN bus in a randomized manner when the nodes are not actively transmitting or receiving data to assist in changing the impedance level of the bus when other nodes are performing the cryptographic key transmission process. Thus, embodiments of each of the nodes depicted in FIG. 3 include the switches described herein to provide isolation and these nodes are configured to perform either or both of the active and passive helper mode operations that are described above.

The embodiments described herein describe methods for voltage side-channel attacks against devices that transmit simultaneously using a shared communication medium such as CAN Bus in which the attacker can identify which node transmits a bit of data. The embodiments also describe systems and methods that reduce or eliminate the effectiveness of these attacks. These embodiments protect against adversaries that can physically probe the voltage characteristics of communication medium using high resolution equipment. Examples of systems that can use these methods include, but are not limited to, automotive systems (cars, buses, trucks, farm equipment, trains), industrial systems that use CAN bus, control panels for DC-electrical power distribution systems, and security systems that use CAN bus. The embodiments described herein protect against side-channel attacks that target voltage based features by an adversary that utilizes these features to extract secret key data exchanged by nodes that transmit logical 0 and 1 bits through a shared communication medium simultaneously. To mitigate these issues, one embodiment utilizes the dependence of the voltage on network impedance. A countermeasure controller adjusts the load impedance randomly over time to modify the voltage level that the adversary observes on the bus in an unpredictable manner. Another architecture includes a node that provides voltage feedback to regulate the voltage level seen on the CAN bus to a stable value that prevents the adversary from observing smaller variations in voltage levels that could be used to identify specific nodes that transmit particular bits of data. Another embodiment includes multiple transceivers that can change the voltage level observed on the bus in a randomized manner to obfuscate the voltage signals that an adversary observes adversarial in the shared communication medium, including a single node configured with multiple transceivers, groups of nodes that multiplex the transmission of data from multiple transceivers, and nodes that cooperate with one another.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for operation of at least one node in a communication network comprising:
adjusting, with a controller in a first node, a resistance of a first potentiometer in the first node to a first resistance level that the controller in the first node determines randomly, the first potentiometer in the first node being connected to an output of a transceiver in the first node and to a shared communication medium; and
transmitting, with the transceiver in the first node, a first data bit through the output that is connected to the shared communication medium with the first potentiometer producing the first resistance level.

2. The method of claim 1 further comprising:
adjusting, with the controller in the first node, the resistance of the first potentiometer to a second resistance level that the controller in the first node determines randomly, the second resistance level being different than the first resistance level; and
transmitting, with the transceiver in the first node, a second data bit through the output to the shared communication medium with the first potentiometer producing the second resistance level.

3. The method of claim 1 further comprising:
transmitting, with the transceiver in the first node, the first data bit through a controller area network (CAN) bus shared communication medium with the potentiometer producing the first resistance level.

4. The method of claim 1 further comprising:
adjusting, with a controller in a second node, a resistance of a second potentiometer in the second node to a second resistance level that the controller in the second node determines randomly, the potentiometer in the second node being connected to an output of a transceiver in the second node and to the shared communication medium; and
transmitting, with the transceiver in the second node, a second data bit through the output of the transceiver that is connected to the shared communication medium with the potentiometer producing the second impedance level, the transmitting of the second data bit occurring simultaneously to the transmission of the first data bit from the first node to prevent an adversary node that is connected to the shared communication medium from determining that the first node transmitted the first bit and the second node transmitted the second bit through the shared communication medium.

5. The method of claim 1 further comprising:
adjusting, with the controller in the first node, a resistance of a second potentiometer in the first node to a second resistance level that the controller in the first node determines randomly within a predetermined resistance range, the second potentiometer in the first node being connected between a drive voltage source in the first node and the transceiver; and
transmitting, with the transceiver in the first node, the first data bit through the output that is connected to the shared communication medium with the first potentiometer producing the first resistance level and the second potentiometer producing the second resistance level, the second potentiometer setting a voltage level that drives the transceiver to adjust an output voltage level of the first bit.

6. The method of claim 1 further comprising:
adjusting, with the controller in the first node, the resistance of the first potentiometer in the first node to a second resistance level that the controller in the first node determines randomly, the second resistance level being different than the first resistance level, to adjust an impedance level of the shared communication medium while a second node that is connected to the shared communication medium transmits a second bit of data simultaneously to a third node that is connected to the shared communication medium transmitting a third bit of data to prevent an adversary node that is connected to the shared communication medium from determining which of the second node and the third node transmitted the second bit of data and the third bit of data.

7. The method of claim 1 further comprising:
opening, with the controller in a first node, a switch in the first node that is connected to the output of the transceiver to isolate the transceiver and the first potentiometer from the shared communication medium to adjust an impedance level of the shared communication medium while a second node that is connected to the shared communication medium transmits a second bit of data simultaneously to a third node that is connected to the shared communication medium transmitting a third bit of data to prevent an adversary node that is connected to the shared communication medium from determining which of the second node and the third node transmitted the second bit of data and the third bit of data.

8. A method for operation of a node in a communication network comprising:
detecting, with a transceiver in the node, that a bit is being transmitted by another node through a shared communication medium that is connected to the transceiver;
sampling, with a sample and hold circuit in the node, a voltage level in the shared communication medium while the bit is being transmitted by the other node through the shared communication medium;
generating, with a difference circuit in the node, an output signal corresponding to a difference between the voltage level from the sample and hold circuit and a predetermined reference voltage;
generating, with a voltage regulating circuit in the node, a correction voltage level based on a sum of the output signal from the difference circuit and a predetermined voltage level of a drive voltage source in the node; and
transmitting, with the transceiver in the node, an output voltage to the shared communication medium based on the correction voltage level to drive the voltage level of the shared communication medium to the predetermined reference voltage while the bit is being transmitted by the other node through the shared communication medium.

9. A method for operation of a node in a communication network comprising:
operating, with a controller in the node, a multiplexer to control a plurality of transceivers in the node to transmit a plurality of bits to a shared communication medium simultaneously, the controller selecting the bits for transmission randomly, wherein at least one bit is a dominant bit for transmission through the shared communication medium.

10. The method of claim 9 further comprising:
operating, with a controller in the node, the multiplexer to control a plurality of switches in the node to disconnect one of the plurality of transceivers from the shared communication medium while at least one other transceiver in the plurality of transceivers transmits the dominant bit through the shared communication medium.

* * * * *